(12) United States Patent
Ishiyama

(10) Patent No.: US 9,056,711 B2
(45) Date of Patent: Jun. 16, 2015

(54) PLASTIC SHEET FOR PACKAGING CONTAINER

(75) Inventor: Keijiro Ishiyama, Chiba (JP)

(73) Assignee: J-Chemical Corporation, Chiba (JP)

( * ) Notice: Subject to any disclaimer, the term of this patent is extended or adjusted under 35 U.S.C. 154(b) by 959 days.

(21) Appl. No.: 12/599,570

(22) PCT Filed: May 11, 2007

(86) PCT No.: PCT/JP2007/059726
§ 371 (c)(1),
(2), (4) Date: Nov. 10, 2009

(87) PCT Pub. No.: WO2008/139593
PCT Pub. Date: Nov. 20, 2008

(65) Prior Publication Data
US 2010/0143624 A1    Jun. 10, 2010

(51) Int. Cl.
| | |
|---|---|
| *B29D 22/00* | (2006.01) |
| *B29D 23/00* | (2006.01) |
| *B32B 1/08* | (2006.01) |
| *B32B 27/32* | (2006.01) |
| *B65D 81/28* | (2006.01) |
| *B32B 27/08* | (2006.01) |
| *B32B 27/18* | (2006.01) |
| *B32B 27/30* | (2006.01) |
| *B65D 30/08* | (2006.01) |

(52) U.S. Cl.
CPC ........... *B65D 81/28* (2013.01); *Y10T 428/1341* (2015.01); *B32B 27/08* (2013.01); *B32B 27/18* (2013.01); *B32B 27/30* (2013.01); *B32B 27/32* (2013.01); *B65D 31/02* (2013.01)

(58) Field of Classification Search
CPC ........ B65D 81/28; B65D 31/02; B32B 27/08; B32B 27/18; B32B 27/30; B32B 27/32; Y10T 428/1341
USPC ............. 428/34.8, 35.2, 36.91, 500; 426/105, 426/127, 129
See application file for complete search history.

(56) References Cited

U.S. PATENT DOCUMENTS

| | | | | |
|---|---|---|---|---|
| 4,239,826 A | * | 12/1980 | Knott et al. | 428/36.7 |
| 4,407,897 A | * | 10/1983 | Farrell et al. | 428/516 |
| 4,650,721 A | * | 3/1987 | Ashcraft et al. | 428/516 |
| 4,816,342 A | * | 3/1989 | Farrell et al. | 428/475.5 |

(Continued)

FOREIGN PATENT DOCUMENTS

| | | |
|---|---|---|
| JP | 2000-335599 | 12/2000 |
| JP | 2002-514983 T | 5/2002 |

(Continued)

*Primary Examiner* — Michael C Miggins
(74) *Attorney, Agent, or Firm* — Carrier Blackman & Associates, P.C.; Joseph P. Carrier; William D. Blackman

(57) ABSTRACT

A plastic sheet for a packaging container with which the activity of microorganisms which stays on a stored matter such as raw fishes and meats before packaging or adheres thereto after packaging is lowered, and the growth of the microorganisms is suppressed in the case of storing or transporting meat and fish bodies in a raw state.
The plastic sheet for a packaging container comprises a three-layer structure plastic sheet layered using a polyethylene film as an inner layer containing an antioxidant and an antibacterial, a polyvinyl alcohol film as an intermediate layer having high gas barrier properties and a polypropylene film as an outer layer.

19 Claims, 7 Drawing Sheets

(56) References Cited

U.S. PATENT DOCUMENTS

| | | | |
|---|---|---|---|
| 4,919,984 A * | 4/1990 | Maruhashi et al. | 428/36.4 |
| 5,153,038 A * | 10/1992 | Koyama et al. | 428/35.8 |
| 5,380,586 A * | 1/1995 | Knoerzer et al. | 428/349 |
| 5,491,023 A * | 2/1996 | Tsai et al. | 428/349 |
| 5,508,113 A * | 4/1996 | Knoerzer | 428/500 |
| 5,741,566 A * | 4/1998 | Hogstrom et al. | 428/35.2 |
| 6,197,305 B1 * | 3/2001 | Friedman et al. | 424/737 |
| 6,294,186 B1 * | 9/2001 | Beerse et al. | 424/405 |
| 6,364,987 B1 * | 4/2002 | Takada et al. | 156/244.11 |
| 6,869,681 B2 * | 3/2005 | Okamoto et al. | 428/373 |
| 6,872,459 B1 * | 3/2005 | Frisk et al. | 428/474.4 |
| 7,063,882 B2 * | 6/2006 | Mossbrook et al. | 428/203 |
| 7,183,006 B2 | 2/2007 | Bamore et al. | |
| 7,311,933 B2 * | 12/2007 | Bringley et al. | 426/124 |
| 7,497,623 B2 * | 3/2009 | Thomas et al. | 383/63 |
| 7,951,436 B2 * | 5/2011 | Knoerzer et al. | 428/35.3 |
| 7,972,635 B2 * | 7/2011 | Seabrook et al. | 424/736 |
| 8,012,554 B2 * | 9/2011 | Shelley et al. | 428/36.6 |
| 8,025,977 B2 * | 9/2011 | Loretti et al. | 428/500 |
| 2003/0223657 A1 * | 12/2003 | Belias et al. | 383/105 |
| 2004/0151934 A1 * | 8/2004 | Schwark et al. | 428/518 |
| 2005/0158569 A1 * | 7/2005 | Aral et al. | 428/500 |
| 2005/0220375 A1 * | 10/2005 | Thomas et al. | 383/105 |
| 2006/0008539 A1 * | 1/2006 | Tomioka | 424/725 |
| 2006/0222845 A1 * | 10/2006 | Deng et al. | 428/336 |
| 2006/0291756 A1 * | 12/2006 | Thomas et al. | 383/105 |
| 2007/0065397 A1 * | 3/2007 | Ito et al. | 424/76.2 |
| 2008/0200793 A1 * | 8/2008 | Furue et al. | 600/393 |
| 2008/0230744 A1 * | 9/2008 | Hiramoto et al. | 252/188.28 |
| 2009/0042468 A1 * | 2/2009 | Suzuki et al. | 442/76 |
| 2010/0019197 A1 * | 1/2010 | Hiramoto et al. | |
| 2010/0189993 A1 * | 7/2010 | Mori et al. | 428/317.5 |
| 2011/0135720 A1 * | 6/2011 | Seabrook et al. | 424/451 |

FOREIGN PATENT DOCUMENTS

| | | |
|---|---|---|
| JP | 2003-291281 | 10/2003 |
| JP | 2006-014630 | 1/2006 |
| JP | 2007-516336 T | 6/2007 |
| WO | 98/31731 A1 | 7/1998 |
| WO | 2005-061613 A1 | 7/2005 |

\* cited by examiner

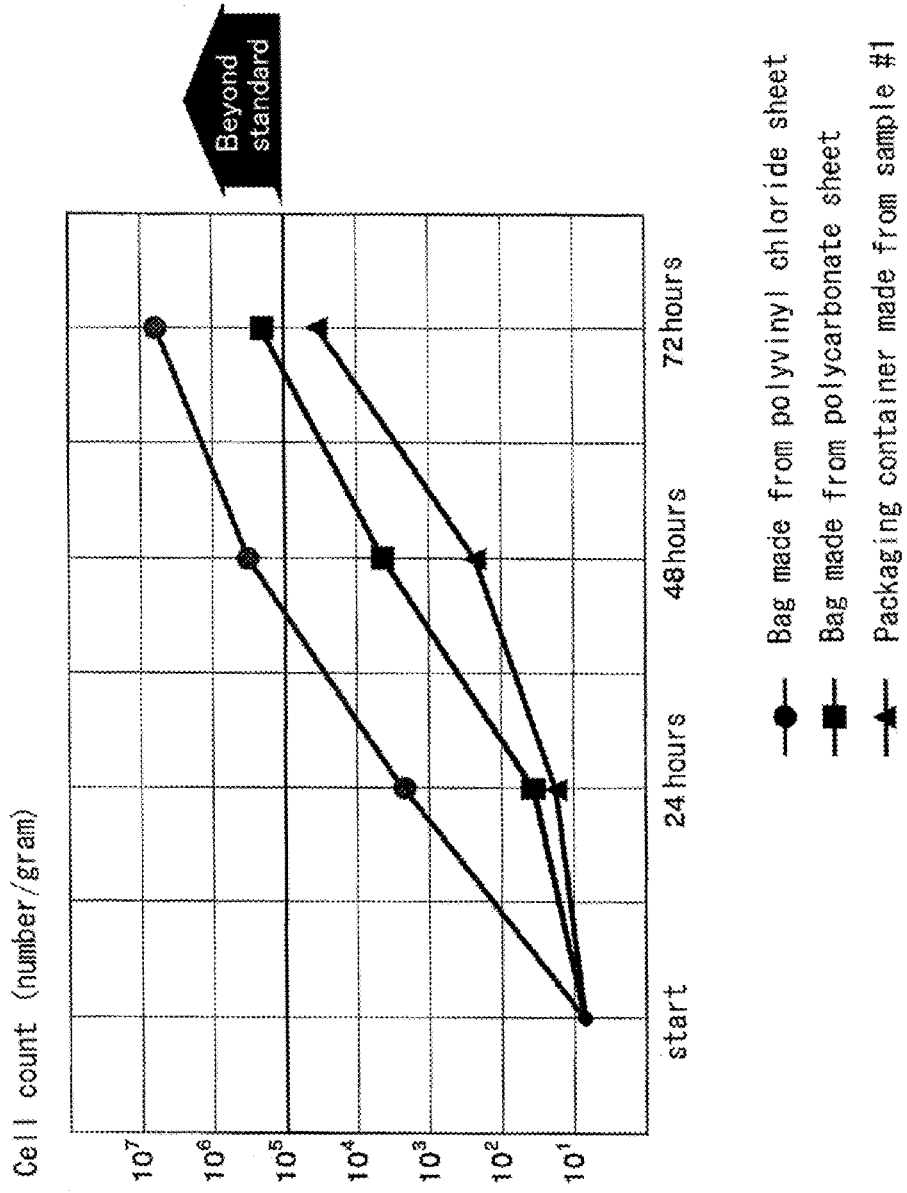

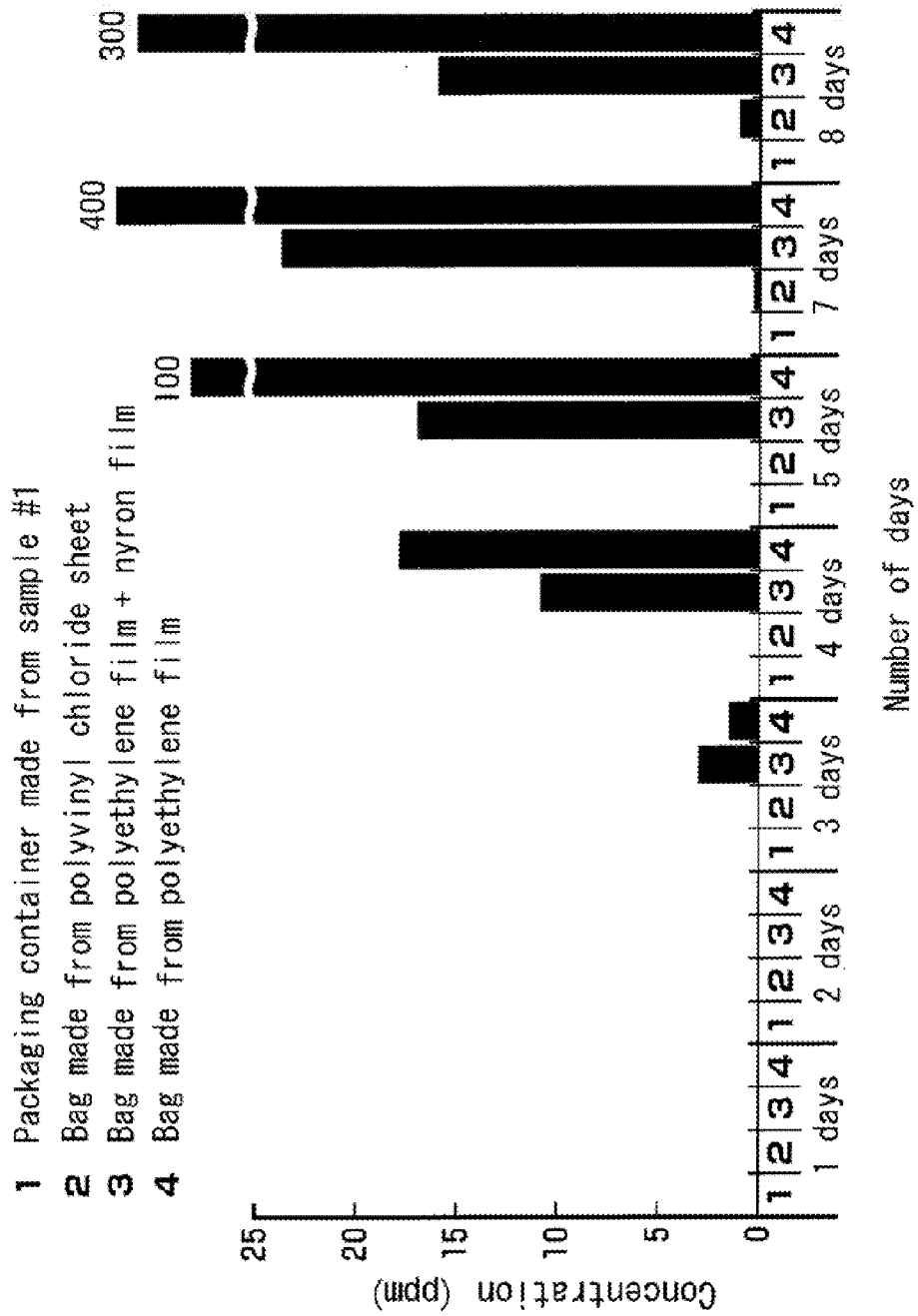

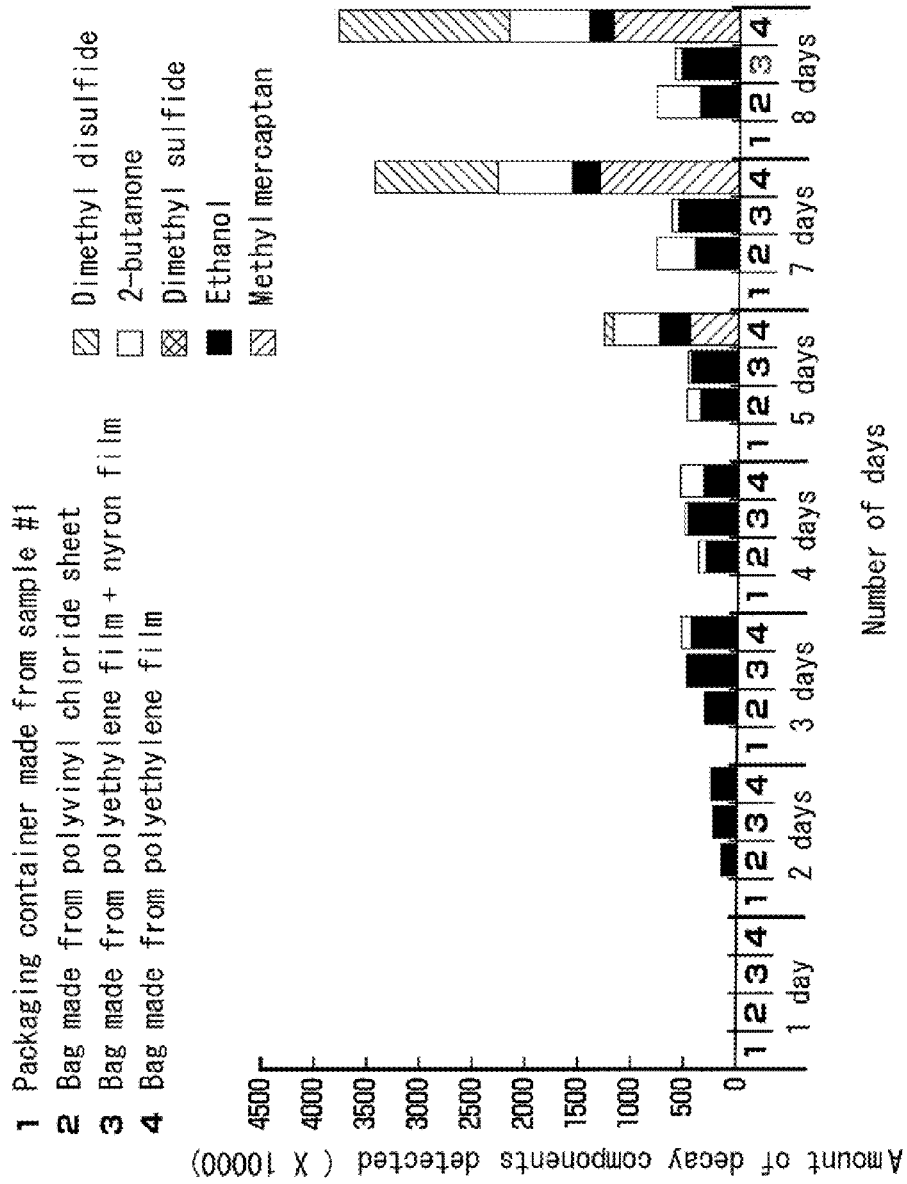

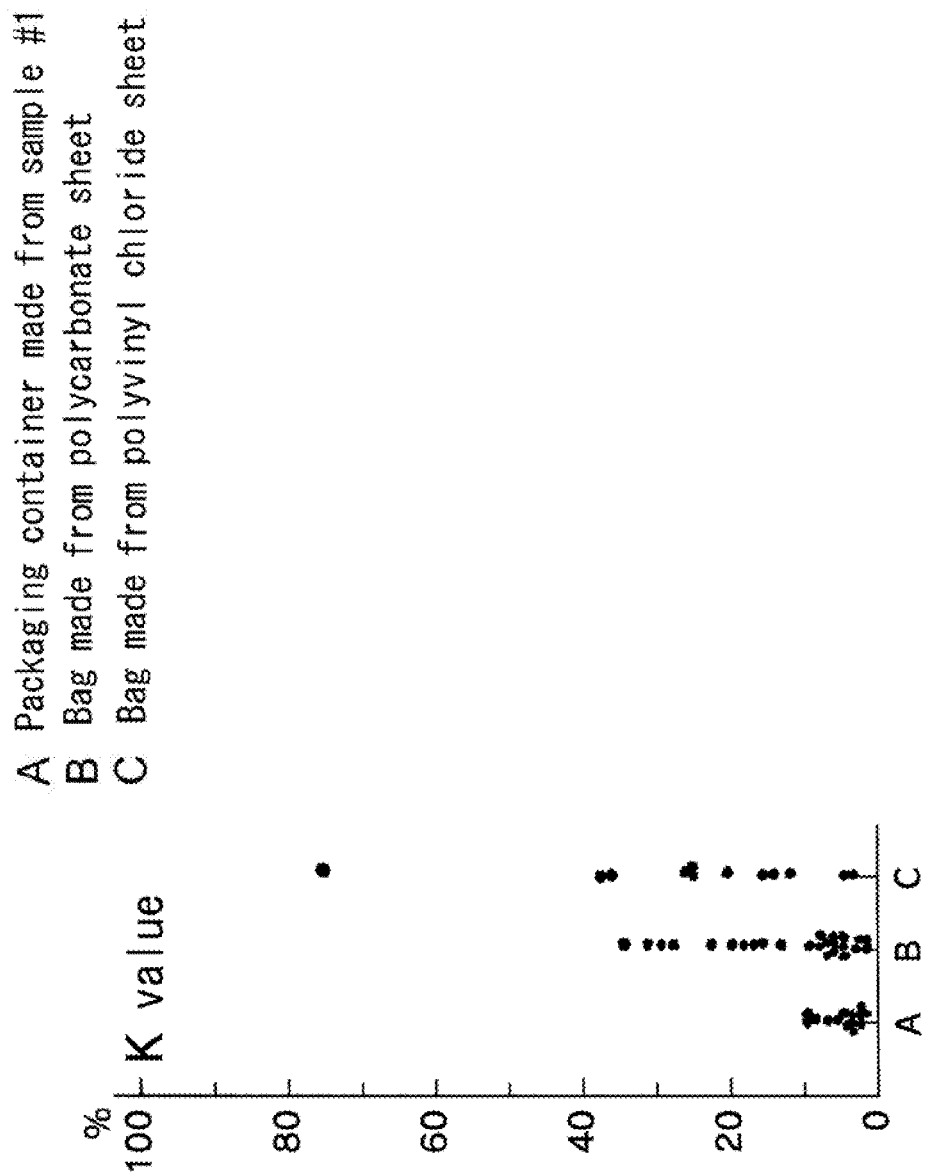

PLASTIC SHEET FOR PACKAGING CONTAINER

TECHNICAL FIELD

The present invention relates to a plastic sheet for a packaging container for packaging raw fish and meats and other storage matter in a container for long-term storage.

BACKGROUND ART

Tuna, bonito, and other large fish caught by deep-sea fishing or commercially grown in remote areas have their internal organs and the like removed at the fishery where they were raised or on the fishing vessel where they are caught fish, after which they are cut and frozen or wholly frozen at low temperature into blocks to be preserved and transported to the consuming region in a frozen state.

On the other hand, the whole or cut blocks are conventionally inserted in a bag made of plastic film having low-oxygen gas permeability in a reduced-pressure state as proposed in Patent Documents 1 and 2. The blocks are sealed, the packaging bag or a plurality of the packaging bags packaged in the same manner are stored at low temperature using ice or another cooling agent in a Styrofoam container or the like.

However, a conventional method uses a plastic film having gas barrier properties as a package, uses a Styrofoam container or the like as the wrapping, and stores and transports raw fish. Such a method cannot suppress the proliferation of bacteria and other microorganisms that were present before the raw fish were packaged or that were deposited after packaging, and the freshness of the raw fish cannot be adequately maintained over a long period of time. When the interior of the plastic film bag is degassed using a vacuum packaging machine, the interior of the package is decompressed, whereby drip outflow from, e.g., the raw tuna block is facilitated and this facilitates the occurrence of new bacteria. The same phenomenon occurs in the case of raw meats and the like.

Patent Document 1: Japanese Patent Application Laid Open 2000-335599
Patent Document 2: Japanese Patent Application Laid Open 2006-14630

DISCLOSURE OF THE INVENTION

Problems the Invention is to Solve

In view of the above facts, an object of the present invention is to provide a packaging container that improves a conventional plastic sheet for a packaging material, for example, reduces the activity of microorganisms that were left behind on the storage raw fish and meats or other storage matter before being packaged or that were deposited after packaging, and suppresses the proliferation of the microorganisms.

Means of Solving the Problems

In order to solve the problems described above, the first aspect of the present invention is a plastic sheet for a packaging container, characterized in comprising a two-layer structure plastic sheet layered using a polyethylene film as an inner layer containing an antioxidant and an antibacterial and a polyvinyl alcohol film as an outer layer having high gas barrier properties.

The second aspect is characterized in that the polyethylene film contains 1 to 20 parts by weight of the sum of an antioxidant and an antibacterial per 100 parts by weight of the polyethylene film.

The third aspect is characterized in that the two-layer structure plastic sheet structure has the thickness of the polyethylene film set to 50 to 200 µm and the thickness of the polyvinyl alcohol film set to 12 to 30 µm.

The fourth aspect is characterized in comprising a three-layer structure plastic sheet layered using a polyethylene film as an inner layer containing an antioxidant and an antibacterial, a polyvinyl alcohol film as an intermediate layer having high gas barrier properties, and a polypropylene film as an outer layer.

The fifth aspect is characterized in that the polyethylene film contains 1 to 20 parts by weight of the sum of an antioxidant and an antibacterial per 100 parts by weight of the polyethylene film.

The sixth aspect is characterized in that the three-layer structure plastic sheet structure has the thickness of the polyethylene film set to 50 to 200 µm, the thickness of the polyvinyl alcohol film set to 12 to 30 µm, and the thickness of the polypropylene film set to 15 to 50 µm.

The seventh aspect is characterized in that a preservative is furthermore included in the polyethylene film.

The eighth aspect is characterized in that a packaging container characterized in being manufactured using the plastic sheet for a packaging container, and having an opening part that can be partly unsealed at the periphery, wherein the opening part is formed capable of being unsealed by a fastener and is formed capable of being flattened and thinly folded when storage matter is not being stored.

Effects of the Invention

In accordance with the present invention, a polyethylene film containing an antioxidant in the inner layer of the two-layer structure plastic sheet that is in contact with raw fish and meats or other storage matter is used. Therefore, oxygen or the like derived from oxygen gas or the like remaining in the storage matter from before packaging is reduced by the antioxidant effect of a portion of the antioxidant bled out onto the inner surface of the inner layer. For example, the activity of aerobic bacteria can be dramatically reduced, and the antibacterial effect can be increased as a result. Since an antibacterial is included, there is a synergistic effect between the antibacterial and a portion of the antioxidant that has bled out onto the inner surface of the inner layer, whereby the occurrence of odors and the progress of decay of the storage matter can be prevented because the proliferation of bacteria and other microorganisms deposited on the storage matter after packaging can be suppressed.

The freshness of the storage matter can be viewed from the exterior of the inner layer because the transparency of the polyethylene film is relatively good. Also, natural dripping from the storage matter and other moisture content is not liable to leak to the exterior through the inner layer because the moisture-blocking properties of the polyethylene film are excellent.

The first embodiment of the present invention relates to a two-layer structure plastic sheet. Since a polyvinyl alcohol film having high gas barrier properties is used as the outer layer of the two-layer structure plastic sheet, gas generated by the progression of decay of the storage matter is not passed through the outer layer and discharged to the exterior, and air or the like from the exterior is not liable to pass through the outer layer and enter into the inner layer because the gas barrier properties and transparency are excellent. Also, the freshness of the storage matter can be viewed from the exterior of the outer layer.

Since 1 to 20 parts by weight of the sum of the antioxidant and the antibacterial per 100 parts by weight of the polyethylene film (i.e., 100 parts by weight of a polyethylene resin of a film material, and the same applies hereinbelow), microorganisms deposited on the storage matter are eliminated in a short period of time without compromising the properties of the polyethylene film, thereby further preventing the progress of decay of the storage matter.

There is a synergistic effect between the antibacterial and the antioxidant when a polyethylene film having a content ratio of the antibacterial and the antioxidant in a range 1:1/100 to 1:100 in terms of antibacterial to antioxidant is used. Generally, the antioxidant effect and the antibacterial effect act with good balance when a polyethylene film having a content ratio of the antibacterial and the antioxidant in a range 1:1/10 to 1:10 is used, and it is possible to obtain a plastic sheet for a packaging container that has good general applicability without regard to the type of raw fish, meats, or other storage matter.

Since the outer layer is a polyvinyl alcohol film having high gas barrier properties in which the oxygen gas transmissivity is 1.0 cc/m²·d·atm or less, the possibility that gas generated by the progress of decay of the storage matter passes through the outer layer and is discharged to the exterior and that air or the like from the exterior will pass through the outer layer and enter into the inner layer is reduced, whereby the activity of aerobic microorganisms can be reduced and the proliferation thereof can be suppressed. It is particularly preferred that the polyvinyl alcohol film having high gas barrier properties be one in which the transmissivity of the oxygen gas is 0.5 to 0.7 cc/m²·d·atm.

Since a two-layer structure plastic sheet composed of a polyethylene film having a thickness of 50 to 200 µm and a polyvinyl alcohol film having a thickness of 12 to 30 µm are used, the effect of suppressing the proliferation of microorganisms by the polyethylene film containing the antioxidant and the antibacterial and the gas barrier effect of the polyvinyl alcohol film are demonstrated with good balance, and it is possible to obtain a plastic sheet for a packaging container that has good general applicability.

The second embodiment of the present invention relates to a three-layer structure plastic sheet. The plastic sheet for a packaging container is composed of a three-layer structure plastic sheet layered using a polyethylene film as an inner layer containing an antioxidant and an antibacterial, a polyvinyl alcohol film as an intermediate layer having high gas barrier properties, and a polypropylene film as an outer layer. Therefore, the plastic sheet for a packaging container has good resistance to impacts from the exterior of the outer layer, can withstand long-term use, the external surface can be printed on, and the state of freshness of the storage matter can be viewed from the exterior of the outer layer, because the mechanical strength and transparency of the polypropylene film is good and the colorability is excellent. Therefore, the packaging container manufactured using the three-layer structure plastic sheet also serves as external packaging and can therefore also serve as an outer covering. Humidity from the exterior is prevented from passing through the outer layer by moisture blocking properties of the polypropylene film and is prevented from reaching the polyvinyl alcohol film as the intermediate layer. The polyvinyl alcohol film as the intermediate layer can thereby avert the loss of the gas barrier effect due to the effect of humidity.

Since the three-layer structure plastic sheet has a polypropylene film having a thickness of 15 to 50 µm, the gas barrier effect, the effect of suppressing the proliferation of microorganisms deposited on storage matter, and the impact-resistance and durability are demonstrated with good balance, and it is possible to obtain a plastic sheet for a packaging container that has good general applicability.

In the two-layer and three-layer structure plastic sheets, a preservative may furthermore be included in the polyethylene film of the inner layer in contact with the storage matter. The entry, growth, and proliferation of microorganisms can be prevented by part of the preservative that has bled out on the inner surface of the inner layer, and the synergistic effect of the antioxidant, antibacterial, and preservative can prevent the decay of raw fish, meats, and other storage matter for which freshness is particularly important in terms of product value.

Since the polyethylene film contains 1 to 20 parts by weight of the sum of an antioxidant and an antibacterial per 100 parts by weight of the polyethylene film (i.e., 100 parts by weight of a polyethylene resin of a film material, and the same applies hereinbelow), it is possible to obtain a plastic sheet for a packaging container in which the freshness of the storage matter can be maintained and long-term storage is made possible without compromising the properties of the polyethylene film.

There is a synergistic effect between the antioxidant, the antibacterial, and the preservative when a polyethylene film having a content ratio of the antioxidant and the antibacterial as a sum, and the content ratio of the preservative in a range 1:1/10 to 1:10 is used. Generally, the antioxidant effect, the antibacterial effect, and the preservative effect act with good balance when a polyethylene film having the content ratio described above in a range 1:1/5 to 1:5 is used, and it is possible to obtain a plastic sheet for a packaging container that has good general applicability that is advantageous for raw fish, meats, and other storage matter for which freshness is particularly important in terms of product value.

The packaging container according to the present invention is manufactured from a plastic sheet for a packaging container, has an opening part that can be partly unsealed at the periphery, is formed so that the opening part that can be sealed using a fastener, and is configured so as to be capable of being thinly flattened and folded when storage matter is not being stored. Therefore, a sealed bag can be formed, the progress of decay of the storage matter and the occurrence of bad odor are suppressed, and the leakage of moisture, gas, or the like from the storage matter to the exterior can be prevented during storage of the storage matter over a long period of time. The storage matter can be viewed from the exterior, numerous bags can be conveniently prepared in advance in preparation for storage and use, and the process for storing the storage matter can be facilitated.

BRIEF DESCRIPTION OF THE DRAWINGS

FIG. 5 is a diagram showing the result of measuring the viable cell count of bacteria in raw tuna at 10° C. to 20° C.;

FIG. 6 is a diagram showing the result of measuring the transmission rate of hydrogen sulfide;

FIG. 7 is a diagram showing the result of measuring the transmission rate of decay components; and FIG. 8 is a diagram showing the result of measuring the K value in raw tuna.

KEY TO THE SYMBOLS

Figure 1:
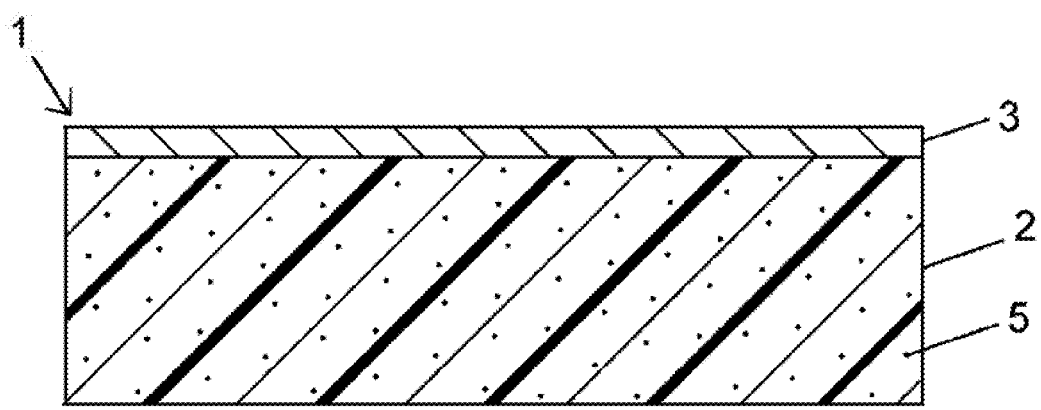
FIG. 1 is a cross-sectional view of the first embodiment of the present invention.

1 Plastic sheet for a packaging container of the first embodiment of the present invention
2, 12 Polyethylene film
3, 13 Polyvinyl alcohol film
5 Antioxidant/antibacterial
11 Plastic sheet for a packaging container of the second embodiment of the present invention
14 Polypropylene film
6 Packaging container of the present invention
7 Bag main body
8 Fastener
9 Upper plastic sheet
9' Lower plastic sheet

BEST MODE FOR CARRYING OUT THE INVENTION

Figure 2:
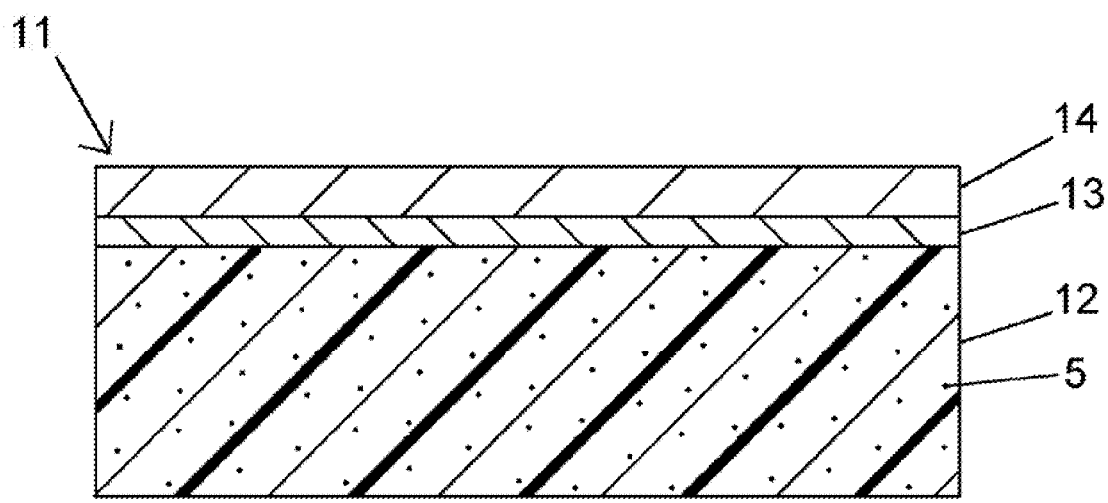
FIG. 2 is a cross-sectional view of the second embodiment of the present invention.

Next, the best mode for the plastic sheet for a packaging container of the present invention is described with reference to the drawings. FIG. 1 shows a cross-sectional view of the first embodiment of the plastic sheet for a packaging container of the present invention. FIG. 2 is a cross-sectional view of the second embodiment of the plastic sheet for a packaging container of the present invention. The same reference numerals are assigned to the same constituent parts in all the drawings.

The plastic sheet 1 for a packaging container of the first embodiment shown in FIG. 1 is composed of a two-layer structure sheet layered that includes a polyethylene film 2 having a thickness of 50 to 200 μm, preferably a thickness of 100 μm as inner layer, and a polyvinyl alcohol film 3 having high gas barrier properties and a thickness of 12 to 30 μm, preferably a thickness of 12 μm as an external layer.

An antioxidant and antibacterial are mixed with polyethylene film 2 and preservatives may also be added. The antioxidant substance and antibacterial are schematically shown in the drawings and the same reference numeral 5 is used (the same applies when a preservative is added). Content ratios of the antioxidant substance, the antibacterial, and the preservative are preferably modified in a range of the content ratios in accordance with properties of the specific storage matter, e.g., the type and size of the raw fish and meats in the case that the bag is made of a two-layer structure sheet and used as a packaging container. For example, the antioxidant content ratio is preferably increased when the bag is used for storage matter for which strong antioxidants are particularly elective for suppressing the progress of decay. The antibacterial content ratio is preferably increased when the bag is used for storage matter for which a strong antibacterial is particularly effective, and the preservative content ratio is preferably increased when the bag is used for storage matter for which strong preservatives are particularly effective.

The storage matter is not limited to raw fish and meats, and it is also possible to store rice, wheat, and other grains, as well as human and animal remains.

The antioxidant preferably contains one type or a combination of types selected from flavonoids, tannins, anthocyanins, isoflavones, and other polyphenols, catechin, vitamin C, vitamin E, and the like in accordance with the specific properties of the storage matter in the case of packaging container.

The antibacterial preferably contains one type or a combination of types selected from a silver-ion antibacterial, a phenol ether-based antibacterial, natural antibacterial, glycerine fatty acid esters, and the like in accordance with the specific properties of the storage matter in the case of packaging container.

The preservative preferably contains one type or a combination of types selected from, e.g., paraben or another preservative in accordance with the specific properties of the storage matter in the case of packaging container.

The content of antioxidant and antibacterial in the polyethylene film 2 is 1 to 20 parts by weight of the sum of the antioxidant and the antibacterial per 100 parts by weight of the polyethylene film, preferably 3 to 10 parts by weight. The content ratio of the antibacterial and the antioxidant is in a range 1:1/100 to 1:100 (antibacterial to antioxidant), preferably in a range 1:1/10 to 1:10.

In the case that a preservative is also included, the content of antioxidant, antibacterial, and the preservatives as a total is 1 to 20 parts by weight per 100 parts by weight of the polyethylene film, more particularly preferred is 3 to 10 parts by weight.

A low-density polyethylene film is preferably used as the polyethylene film because the heat seal properties and transparency are excellent. Therefore, the periphery of the bag is readily fused together when the bag is manufactured using a bag-making machine, and a packaging container having high transparency and high seal strength can be readily obtained.

Since a polyvinyl alcohol film 3 having high-gas barrier properties in which the oxygen gas permeability is 1.0 cc/m$^2$·d·atm or less, preferably 0.5 to 0.7 cc/m$^2$·d·atm or less as is layered as the outer layer on the polyethylene film 2, a high quality plastic sheet for a packaging container having high transparency and particularly high gas barrier properties can be obtained. Such a structure is preferred in that a two-layer structure sheet having very high gas barrier properties can be obtained when a drawn polyvinyl alcohol film is used as the polyvinyl alcohol film having high gas barrier properties.

The entire thickness of the two-layer structure sheet, i.e., the thicknesses of the inner and outer layers, is not particularly limited, and may be arbitrarily modified in accordance with the type and purpose of the packaging container in which the layers are to be used. For example, when the bag is used as packaging for a single raw tuna, the thickness of the polyethylene film is preferably 50 to 200 μm, the thickness of the polyvinyl alcohol film is preferably 12 to 30 μm, and the thickness of the entire two-layer structure sheet is preferably 62 to 220 μm.

The plastic sheet 1 for a packaging container 11 of the second embodiment shown in FIG. 2 is composed of a three-layer structure sheet layered that includes a polyethylene film 12 having a thickness of 50 to 200 μm, preferably a thickness of 100 μm as inner layer; a polyvinyl alcohol film 13 having high gas barrier properties and a thickness of 12 to 30 μm, preferably a thickness of 12 μm as an intermediate layer; and a polypropylene film 14 having a thickness of 15 to 50 μm, preferably a thickness of 20 μm as an outer layer.

The content of the antioxidant and the antibacterial in the polyethylene film is 1 to 20 parts by weight, preferably 3 to 10 parts by weight, as a sum of the antioxidant and the antibacterial per 100 parts by weight of the polyethylene film in the same fashion as the first embodiment. The content ratio of the antibacterial and the antioxidant is preferably 1:1/100 to 1:100, preferably in a range of 1:1/10 to 1:10 in terms of antibacterial to antioxidant. A low-density polyethylene film is used as the polyethylene film, but the same as that used in the first embodiment is preferred.

In the case that a preservative is furthermore added, the content ratio is 1 to 20 parts by weight, preferably 3 to 10 parts by weight, as a sum of the antioxidant, the antibacterial, and the preservative per 100 parts by weight of the polyethylene film in the same fashion as the first embodiment.

A drawn polyvinyl alcohol film is used as the polyvinyl alcohol film 13, which is layered as the intermediate layer having high gas barrier properties, and is preferably the same as that layered as the outer layer of the first embodiment.

A polypropylene film 14 is layered as the outer layer on the intermediate layer composed of the polyvinyl alcohol film 13. It is preferred that a drawn polypropylene film be used as the polypropylene film because a three-layer structure sheet that further improves the mechanical strength can be obtained.

The thickness of the entire three-layer structure sheet, i.e., the thicknesses of the inner layer, the intermediate layer, and the outer layer are not particularly limited and can be arbitrarily varied in accordance with the type and purpose of the packaging container in which the layers are to be used. When the bag is used as a packaging container for a single raw tuna, the thickness of the polyethylene film 12 is preferably 50 to 200 μm, the thickness of the polyvinyl alcohol film 13 is preferably 12 to 30 μm, the thickness of the polypropylene film 14 is preferably 15 to 50 μm, and the thickness of the entire three-layer structure sheet is preferably 77 to 280 μm.

Figure 3:
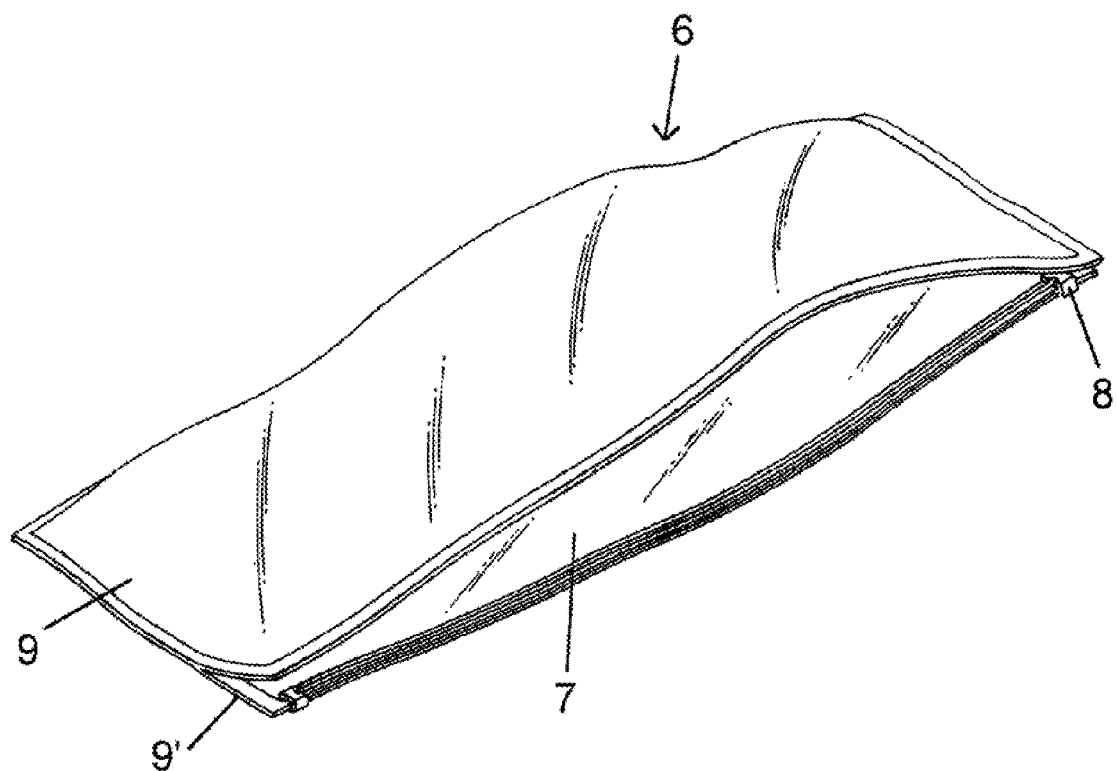
FIG. 3 is a perspective view of the packaging container bag made of the three-layer structure sheet of the second embodiment of the present invention.

FIG. 3 is a perspective view of the packaging container 6 manufactured using the three-layer structure sheet 11 of the second embodiment and formed into a storage preservation bag for a single raw tuna of about 100 kg. The bag main body 7 can be thinly flattened and folded when storage matter is not being stored, and when the bag is to be used, a box-type storage container can be readily formed by merely opening a fastener 8, and grasping, vertically pulling, and spreading out the folded upper and lower plastic sheets 9, 9' that form the top and back surfaces. Therefore, the operation for storing storage matter is facilitated and the storage container itself can also serve as a coffin.

Next, the present invention will be described in greater detail using examples.

Example 1

Test pieces of the present invention were prepared as sample #1 using the three-layer structure plastic sheet of the second embodiment shown in FIG. 2 having a size of about 50 mm×50 mm, and in which a polyethylene film having a thickness of about 0.1 mm was used as the inner layer, a polyvinyl alcohol film having a thickness of about 0.012 mm and high gas barrier properties was used as the intermediate layer, and a polypropylene film having a thickness of 0.020 mm was used as the outer layer to form a three-layer structure sheet having an overall thickness of 0.132 mm. A low-density polyethylene film was used as the polyethylene film of the inner layer, and 5 parts by weight of catechin as the antioxidant and 5 parts by weight of a silver-ion antibacterial as the antibacterial per 100 parts by weight of the polyethylene film were dispersed and added in the low-density polyethylene film. FIG. 2 schematically shows the state in which the 5 parts by weight of the antioxidant and the 5 parts by weight of the antibacterial have been dispersed and added in the polyethylene film as the inner layer.

A test method that conforms to "JIS Z2801 (relevant to antibacterial products, antibacterial test method, and antibacterial effect)" was used. $E.\ coli$ bacteria were seeded as the test bacteria on one surface of the polyethylene film that is in contact with storage matter. After inoculation, a viable cell count of $2.4 \times 10^5$ in measurement 1, a viable cell count of $2.6 \times 10^5$ in measurement 2, a viable cell count of $2.5 \times 10^5$ in measurement 3, and a viable cell count of $2.5 \times 10^5$ as a mean value were measured for each test piece. Sampling was carried out 12 and 24 hours later.

Sample #1 was measured 12 hours later at 35° C., and the viable cell count was reduced to less than 10 relative to measurements 1 through 3 and the mean value thereof. Measurement was similarly carried out 24 hours later and a viable cell count was essentially undetected.

Table 1 shows the results of measuring the viable cell counts of the $E.\ coli$ bacteria of sample #1 of example 1.

Sample #2 was used as a comparative example 1 of example 1, wherein 10 parts by weight of a silver-ion antibacterial were dispersed and admixed as an antibacterial per 100 parts by weight of the polyethylene film in the low-density polyethylene film of the inner layer of the same three-layer structure plastic sheet of sample #1. The viable cell counts of the $E.\ coli$ bacteria of sample #2 immediately after inoculation were the same as measurements 1 through 3 and the mean value of sample #1.

Sample #2 was measured 12 hours later at 35° C., and the viable cell count of measurement 1 was reduced to less than 80, the viable cell count of measurement 2 was reduced to less than 70, the viable cell count of measurement 3 was reduced to less than 90, and the mean value of the viable cell counts was reduced to less than 80. Measurements were similarly carried out 24 hours later, and the viable cell counts of measurements 1 through 3 and the mean value thereof were reduced to 10 or less.

Table 1 shows the results of measuring the viable cell counts of the $E.\ coli$ bacteria of sample #2 of comparative example 1.

Sample #3 was used as a comparative example 2 of example 1, wherein 10 parts by weight of catechin were dispersed and admixed as an antioxidant per 100 parts by weight of the polyethylene film in the low-density polyethylene film of the inner layer of the same three-layer structure plastic sheet of sample #1. The viable cell counts of the $E.\ coli$ bacteria of sample #3 immediately after inoculation were the same as measurements 1 through 3 and the mean value of sample #1.

Sample #3 was measured 12 hours later at 35° C., and the viable cell count of measurement 1 was $3.1 \times 10^2$, the viable cell count of measurement 2 was $2.9 \times 10^2$, the viable cell count of measurement 3 was $3.4 \times 10^2$, and the mean value of the viable cell counts was $3.1 \times 10^2$. Measurements were similarly carried out 24 hours later, and the viable cell counts of measurements 1 through 3 and the mean value thereof were reduced to 10 or less.

Table 1 shows the results of measuring the viable cell counts of the $E.\ coli$ bacteria of sample #3 of comparative example 2.

Sample #4 was used as a comparative example 3 of example 1, wherein an antioxidant, an antibacterial, or other additives were not included in the low-density polyethylene film of the inner layer of the same three-layer structure plastic sheet of sample #1. The viable cell counts of the $E.\ coli$ bacteria of sample #4 immediately after inoculation were the same as measurements 1 through 3 and the mean value of sample #1.

Sample #3 was measured 12 hours later at 35° C., and the viable cell count of measurement 1 was $2.8 \times 10^6$, the viable cell count of measurement 2 was $2.6 \times 10^6$, the viable cell count of measurement 3 was $3.0 \times 10^6$, and the mean value of the viable cell counts was $2.8\times10^6$. Measurements were similarly carried out 24 hours later, and the viable cell count of measurement 1 was $1.4\times10^7$, the viable cell count of measurement 2 was $1.4\times10^7$, the viable cell count of measurement 3 was $1.3\times10^7$, and the mean value of the viable cell counts was $1.4\times10^7$.

Table 1 shows the results of measuring the viable cell count of the *E. coli* bacteria of sample #4 of comparative example 3.

Example 2

Test pieces of the present invention were prepared as sample #1 using the three-layer structure plastic sheet of the second embodiment shown in FIG. 2 having a size of about 50 mm×50 mm, and in which a polyethylene film having a thickness of about 0.1 mm was used as the inner layer, a polyvinyl alcohol film having a thickness of about 0.012 mm and high gas barrier properties was used as the intermediate layer, and a polypropylene film having a thickness of 0.020 mm was used as the outer layer to form a three-layer structure sheet having an overall thickness of 0.132 mm. A low-density polyethylene film was used as the polyethylene film of the inner layer, and 5 parts by weight of catechin as the antioxidant and 5 parts by weight of a silver-ion antibacterial as the antibacterial per 100 parts by weight of the polyethylene film were dispersed and added in the low-density polyethylene film. FIG. 2 schematically shows the state in which the 5 parts by weight of the antioxidant and the 5 parts by weight of the antibacterial have been dispersed and added in the polyethylene film as the inner layer.

A test method that conforms to "JIS Z2801 (relavant to antibacterial products, antibacterial test method, and antibacterial effect)" was used in the same fashion as example 1 described above. *Staphylococcus aureus* bacteria were seeded as the test bacteria on one surface of the polyethylene film that is in contact with storage matter. After inoculation, a viable cell count of $1.2\times10^5$ in measurement 1, a viable cell count of $1.5\times10^5$ in measurement 2, a viable cell count of $1.2\times10^5$ in measurement 3, and a viable cell count of $1.3\times10^5$ as a mean value were measured for each test piece. Sampling was carried out 12 and 24 hours later.

Sample #1 was measured 12 hours later at 35° C., and the viable cell count was reduced to less than 10 as a mean value of measurements 1 through 3. Measurement was similarly carried out 24 hours later and a viable cell count was essentially undetected.

Table 1 shows the results of measuring the viable cell counts of the *Staphylococcus aureus* bacteria of sample #1 of example 2.

Sample #2 was used as a comparative example 4 of example 2, wherein 10 parts by weight of a silver-ion antibacterial were dispersed and admixed as an antibacterial per 100 parts by weight of the polyethylene film in the low-density polyethylene film of the inner layer of the same three-layer structure plastic sheet of sample #1. The viable cell counts of the *Staphylococcus aureus* bacteria of sample #2 immediately after inoculation were the same as measurements 1 through 3 and the mean value of sample #1.

Sample #2 was measured 12 hours later at 35° C., and the viable cell count of measurement 1 was reduced to less than 100, the viable cell count of measurement 2 was reduced to less than 90, the viable cell count of measurement 3 was reduced to less than 100, and the mean value of the viable cell counts was reduced to less than 100. Measurements were similarly carried out 24 hours later, and the viable cell counts of measurements 1 through 3 and the mean value thereof were reduced to 10 or less.

Table 1 shows the results of measuring the viable cell counts of the *Staphylococcus aureus* bacteria of sample #2 of comparative example 4.

Sample #3 was used as a comparative example 5 of example 2, wherein 10 parts by weight of a catechin were dispersed and admixed as an antioxidant per 100 parts by weight of the polyethylene film in the low-density polyethylene film of the inner layer of the same three-layer structure plastic sheet of sample #1. The viable cell counts of the *Staphylococcus aureus* bacteria of sample #3 immediately after inoculation were the same as measurements 1 through 3 and the mean value of sample #1.

Sample #3 was measured 12 hours later at 35° C., and the viable cell count of measurement 1 was measured to be $1.8\times10^2$, the viable cell count of measurement 2 was measured to be $1.6\times10^2$, the viable cell count of measurement 3 was measured to be $1.6\times10^2$, and the mean value of the viable cell counts was measured to be $1.7\times10^2$. Measurements were similarly carried out 24 hours later, and the viable cell counts of measurements 1 through 3 and the mean value thereof were reduced to 10 or less.

Table 1 shows the results of measuring the viable cell counts of the *Staphylococcus aureus* bacteria of sample #3 of comparative example 5.

Sample #4 was used as a comparative example 6 of example 2, wherein an antioxidant, an antibacterial, or other additives were not included in the low-density polyethylene film of the inner layer of the same three-layer structure plastic sheet of sample #1. The viable cell counts of the *Staphylococcus aureus* bacteria of sample #4 immediately after inoculation were the same as measurements 1 through 3 and the mean value of sample #1.

Sample #4 was measured 12 hours later at 35° C., and the viable cell count of measurement 1 was measured to be $1.6\times10^6$, the viable cell count of measurement 2 was measured to be $1.4\times10^6$, the viable cell count of measurement 3 was measured to be $1.2\times10^6$, and the mean value of the viable cell counts was measured to be $1.4\times10^6$. Measurements were similarly carried out 24 hours later, and the viable cell count of measurement 1 was measured to be $2.5\times10^6$, the viable cell count of measurement 2 was measured to be $2.2\times10^6$, the viable cell count of measurement 3 was measured to be $2.3\times10^6$, and the mean value of the viable cell counts was measured to be $2.3\times10^6$.

Table 1 shows the results of measuring the viable cell counts of the *Staphylococcus aureus* bacteria of sample #4 of comparative example 6.

TABLE 1

| | | | Viable cell count per test piece | | | |
|---|---|---|---|---|---|---|
| Test bacteria | Measurement | Test piece | Measurement 1 | Measurement 2 | Measurement 3 | Mean value |
| *E. coli* | Immediately after inoculation | | $2.4\times10^5$ | $2.6\times10^5$ | $2.5\times10^5$ | $2.5\times10^5$ |

TABLE 1-continued

| Test bacteria | Measurement | Test piece | Viable cell count per test piece | | | |
|---|---|---|---|---|---|---|
| | | | Measurement 1 | Measurement 2 | Measurement 3 | Mean value |
| | 12 hours later at 35° C. | Sample #1 | <10 | <10 | <10 | <10 |
| | | Sample #2 | <80 | <70 | <90 | <80 |
| | | Sample #3 | $3.1 \times 10^2$ | $2.9 \times 10^2$ | $3.4 \times 10^2$ | $3.1 \times 10^2$ |
| | | Sample #4 | $2.8 \times 10^6$ | $2.6 \times 10^6$ | $3.0 \times 10^6$ | $2.8 \times 10^6$ |
| | 24 hours later at 35° C. | Sample #1 | — | — | — | — |
| | | Sample #2 | <10 | <10 | <10 | <10 |
| | | Sample #3 | <10 | <10 | <10 | <10 |
| | | Sample #4 | $1.4 \times 10^7$ | $1.4 \times 10^7$ | $1.3 \times 10^7$ | $1.4 \times 10^7$ |
| Staphylococcus aureus | Immediately after inoculation | | $1.2 \times 10^5$ | $1.5 \times 10^5$ | $1.2 \times 10^5$ | $1.3 \times 10^5$ |
| | 12 hours later at 35° C. | Sample #1 | <10 | <10 | <10 | <10 |
| | | Sample #2 | <100 | <90 | <100 | <100 |
| | | Sample #3 | $1.8 \times 10^2$ | $1.6 \times 10^2$ | $1.6 \times 10^2$ | $1.7 \times 10^2$ |
| | | Sample #4 | $1.6 \times 10^6$ | $1.4 \times 10^6$ | $1.2 \times 10^6$ | $1.4 \times 10^6$ |
| | 24 hours later at 35° C. | Sample #1 | — | — | — | — |
| | | Sample #2 | <10 | <10 | <10 | <10 |
| | | Sample #3 | <10 | <10 | <10 | <10 |
| | | Sample #4 | $2.5 \times 10^6$ | $2.2 \times 10^6$ | $2.3 \times 10^6$ | $2.3 \times 10^6$ |

Example 3

Test pieces of the present invention were prepared as sample #1 using the three-layer structure plastic sheet of the second embodiment shown in FIG. 2 having a size of about 50 mm×50 mm, and in which a polyethylene film having a thickness of about 0.1 mm was used as the inner layer, a polyvinyl alcohol film having a thickness of about 0.012 mm and high gas barrier properties was used as the intermediate layer, and a polypropylene film having a thickness of 0.020 mm was used as the outer layer to form a three-layer structure sheet having an overall thickness of 0.132 mm. A low-density polyethylene film was used as the polyethylene film of the inner layer, and 5 parts by weight of catechin as the antioxidant and 5 parts by weight of a silver-ion antibacterial as the antibacterial per 100 parts by weight of the polyethylene film were dispersed and added in the low-density polyethylene film. FIG. 2 schematically shows the state in which the 5 parts by weight of the antioxidant and the 5 parts by weight of the antibacterial have been dispersed and added in the polyethylene film as the inner layer.

A test method that conforms to "JIS Z2801 (relevant to antibacterial products, antibacterial test method, and antibacterial effect)" was used in the same fashion as example 1 described above. *E. coli* bacteria were seeded as the test bacteria on one surface of the polyethylene film that is in contact with storage matter. After inoculation, a viable cell count of 2.3×10⁵ was measured for each test piece. Sampling was carried out 24 hours later.

Sample #1 was measured 24 hours later at 35° C., and the viable cell count was reduced to less than 10.

Table 1 shows the results of measuring the viable cell counts of the *E. coli* bacteria of sample #1 of example 3.

Used as a comparative example 7 of example 3 was a test piece using two-layer structure plastic sheet having a size of about 50 mm×50 mm, and in which a polyethylene film having a thickness of about 0.1 mm was used as the inner layer, and a nylon film having a thickness of about 0.015 mm was used as the outer layer to form a two-layer structure sheet having an overall thickness of 0.115 mm. An antioxidant, an antibacterial, or other additives were not included in the polyethylene film of the inner layer. The viable cell count of the *E. coli* bacteria of comparative example 7 immediately after inoculation was the same as sample #1. Comparative example 7 was measured 24 hours later at 35° C., and the viable cell count of the *E. coli* bacteria increased to 1.3×10⁷ to 1.5×10⁷.

Table 2 shows the results of measuring the viable cell counts of the *E. coli* bacteria of comparative example 7.

Example 4

Test pieces of the present invention were prepared as sample #1 using the three-layer structure plastic sheet of the second embodiment shown in FIG. 2 having a size of about 50 mm×50 mm, and in which a polyethylene film having a thickness of about 0.1 mm was used as the inner layer, a polyvinyl alcohol film having a thickness of about 0.012 mm and high gas barrier properties was used as the intermediate layer, and a polypropylene film having a thickness of 0.020 mm was used as the outer layer to form a three-layer structure sheet having an overall thickness of 0.132 mm. A low-density polyethylene film was used as the polyethylene film of the inner layer, and 5 parts by weight of catechin as the antioxidant and 5 parts by weight of a silver-ion antibacterial as the antibacterial per 100 parts by weight of the polyethylene film were dispersed and added in the low-density polyethylene film.

A test method that conforms to "JIS Z2801 (relevant to antibacterial products, antibacterial test method, and antibacterial effect)" was used in the same fashion as example 1 described above. *Staphylococcus aureus* bacteria were seeded as the test bacteria on one surface of the polyethylene film that is in contact with storage matter. After inoculation, a viable cell count of 1.3×10⁵ was measured for each test piece. Sampling was carried out 24 hours later.

Sample #1 was measured 24 hours later at 35° C., and the viable cell count was reduced to less than 10.

Table 2 shows the results of measuring the viable cell counts of the *Staphylococcus aureus* bacteria of sample #1 of example 4.

Used as a comparative example 8 of example 4 was a test piece using two-layer structure plastic sheet having a size of about 50 mm×50 mm, and in which a polyethylene film having a thickness of about 0.1 mm was used as the inner layer, and a nylon film having a thickness of about 0.015 mm was used as the outer layer to form a two-layer structure sheet having an overall thickness of 0.115 mm. An antioxidant, an antibacterial, or other additives were not included in the polyethylene film of the inner layer. The viable cell count of the

*Staphylococcus aureus* bacteria of comparative example 8 immediately after inoculation was the same as sample #1.

Comparative example 8 was measured 24 hours later at 35° C., and the viable cell count of the *Staphylococcus aureus* bacteria increased to $2.0 \times 10^6$ to $2.6 \times 10^6$.

Table 2 shows the results of measuring the viable cell counts of the *Staphylococcus aureus* bacteria of comparative example 8.

TABLE 2

| Test bacteria | Measurement | Test piece | Viable cell count per test piece |
|---|---|---|---|
| *E. coli* | Immediately after inoculation | | $2.3 \times 10^5$ |
| | 24 hours later at 35° C. | Sample #1 Polyethylene film + nylon film | <10 $1.3 \times 10^7$ to $1.5 \times 10^7$ |
| *Staphylococcus aureus* | Immediately after inoculation | | $1.3 \times 10^5$ |
| | 24 hours later at 35° C. | Sample #1 Polyethylene film + nylon film | <10 $2.0 \times 10^6$ to $2.6 \times 10^6$ |

Example 5

Packaging containers were made from the three-layer structure plastic sheet of the second embodiment shown in FIG. 2 as test packaging containers of the present invention. The packaging containers made of sample #1 had a bag size of about 30 cm vertical×about 50 cm horizontal, wherein a polyethylene film having a thickness of about 0.1 mm was used as the inner layer, a polyvinyl alcohol film having a thickness of about 0.012 mm and high gas barrier properties was used as the intermediate layer, and a polypropylene film having a thickness of 0.020 mm was used as the outer layer to form a three-layer structure sheet having an overall thickness of 0.132 mm. A low-density polyethylene film was used as the polyethylene film of the inner layer, and 5 parts by weight of catechin as the antioxidant and 5 parts by weight of a silver-ion antibacterial as the antibacterial per 100 parts by weight of the polyethylene film were dispersed and added in the low-density polyethylene film.

A testing method was used in which a raw tuna block of about 7 kg is stored in the packaging container made of sample #1, and the viable cell count of bacteria per gram of raw tuna was measured. A sample was taken at the start, and 24-, 48-, and 72-hours later.

A viable cell count of less than $10^1$ per gram of raw tuna was measured immediately after the start of the test at 10° C. to 15° C. The viable cell count declined slightly 24 hours after the start. The viable cell count had increased by a small amount 48 hours later, but the reduced viable cell count was maintained in comparison with the start, and the viable cell count was measured 72 hours later to be about $10^1$.

Figure 4:
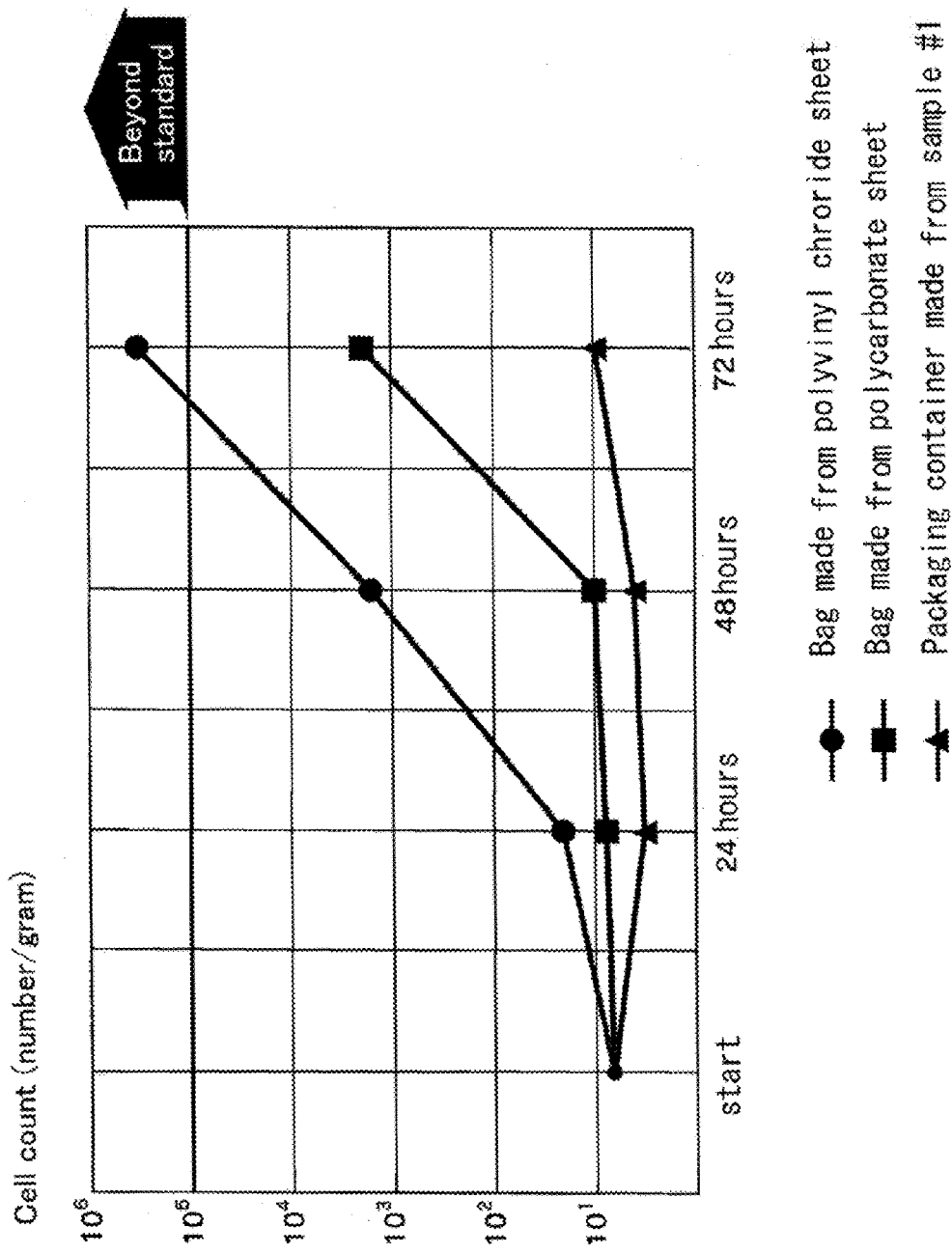
FIG. 4 is a diagram showing the result of measuring the viable cell count of bacteria in raw tuna at 10° C. to 15° C.

FIG. 4 shows the result of measuring the viable cell count of the bacteria in the raw tuna stored in the packaging container made of sample #1 of example 5.

Common packaging bags for raw fish, meats, and the like having substantially the same size as the packaging containers made from sample #1 were made from a polycarbonate sheet having a thickness of 0.1 mm without the use of an antioxidant, an antibacterial, or another additive. These bags were used as comparative example 9 of example 5. A testing method was used in which a raw tuna block of about 7 kg is stored in comparative example 9 in the same fashion as the packaging container made of sample #1, and the viable cell count of bacteria per gram of raw tuna was measured. A sample was taken at the start, and 24-, 48-, and 72-hours later.

A viable cell count of less than $10^1$ per gram of raw tuna was measured immediately after the start of the test at 10° C. to 15° C. The viable cell count was measured and found to be substantially the same as the case of #1 packaging container, was found 24 hours later to be substantially the same count as at the start, and was found to have increased slightly to about $10^1$ 48 hours later. However, 72 hours later the viable cell count was measured and found to have rapidly increased to between $10^3$ and $10^4$.

FIG. 4 shows the result of measuring the viable cell count of the bacteria in the raw tuna stored in the comparative example 9.

Common packaging bags for raw fish, meats, and the like having substantially the same size as the packaging containers made from sample #1 were made from a polyvinyl chloride sheet having a thickness of 0.1 mm without the use of an antioxidant, an antibacterial, or another additive. These bags were used as comparative example 10 of example 5. A testing method was used in which a raw tuna block of about 7 kg is stored in comparative example 10 in the same fashion as the packaging container made of sample #1, and the viable cell count of bacteria per gram of raw tuna was measured. A sample was taken at the start, and 24-, 48-, and 72-hours later.

A viable cell count of less than $10^1$ per gram of raw tuna was measured immediately after the start of the test at 10° C. to 15° C., and was found to be substantially the same as the case of the packaging container made from sample #1. The viable cell count was found 24 hours later to have increased slightly to $10^1$ to $10^2$, and was found to have increased rapidly to between $10^3$ and $10^4$ 48 hours later and then to between $10^5$ and $10^6$ 72 hours later.

FIG. 4 shows the result of measuring the viable cell count of the bacteria in the raw tuna stored in the comparative example 10.

Example 6

Example 6 is a measurement test of bacteria carried out at 10° C. to 20° C. in contrast to the measurement test of bacteria carried out at 10° C. to 15° C. in example 5. The test-packaging container, test method, and sampling of the present invention were otherwise the same as example 5.

A viable cell count of less than $10^1$ per gram of raw tuna was measured immediately after the start of the test at 10° C. to 20° C. and was found to have slightly increased to $10^1$ to $10^2$. However, the viable cell count was found to have increased to $10^2$ to $10^3$ 48 hours later and to $10^4$ to $10^5$ 72 hours later.

FIG. 5 shows the result of measuring the viable cell count of the bacteria in the raw tuna stored in the packaging container made from sample #1 of example 6.

Comparative example 11 of example 6 is a measurement test of bacteria carried out at 10° C. to 20° C. in contrast to the measurement test of bacteria carried out at 10° C. to 15° C. in comparative example 9 of example 5. The parameters were otherwise the same as comparative example 9 of example 5.

A viable cell count of less than $10^1$ per gram of raw tuna was measured immediately after the start of the test at 10° C. to 20° C. and was found to be substantially the same as the case of the packaging container made from sample #1. The viable cell count was found 24 hours later to have increased slightly to $10^1$ to $10^2$, and was found to have increased rapidly to between $10^3$ and $10^4$ 48 hours later and then to between $10^5$ and $10^6$ 72 hours later.

FIG. 5 shows the result of measuring the viable cell count of the bacteria in the raw tuna stored in the comparative example 11.

Comparative example 12 of example 6 is a measurement test of bacteria carried out at 10° C. to 20° C. in contrast to the measurement test of bacteria carried out at 10° C. to 15° C. in comparative example 10 of example 5. The parameters were otherwise the same as comparative example 10 of example 5.

A viable cell count of less than $10^1$ per gram of raw tuna was measured immediately after the start of the test at 10° C. to 20° C. and was found to be substantially the same as the case of the packaging container made from sample #1. The viable cell count was found 24 hours later to have increased slightly to $10^3$ to $10^4$, and was found to have increased rapidly to between $10^5$ and $10^6$ 48 hours later and then to between $10^6$ and $10^7$ 72 hours later.

FIG. 5 shows the result of measuring the viable cell count of the bacteria in the raw tuna stored in the comparative example 12.

Example 7

Test packaging containers of the present invention were prepared as packaging containers made form sample #1 using the three-layer structure plastic sheet of the second embodiment shown in FIG. 2 having a size of about 15 cm×25 cm, and in which a polyethylene film having a thickness of about 0.1 mm was used as the inner layer, a polyvinyl alcohol film having a thickness of about 0.012 mm and high gas barrier properties was used as the intermediate layer, and a polypropylene film having a thickness of 0.020 mm was used as the outer layer to form a three-layer structure sheet having an overall thickness of 0.132 mm. A low-density polyethylene film was used as the polyethylene film of the inner layer, and 5 parts by weight of catechin as the antioxidant and 5 parts by weight of a silver-ion antibacterial as the antibacterial per 100 parts by weight of the polyethylene film were dispersed and added in the low-density polyethylene film. The testing method was carried out by storing about 100 g of raw meat in a sealed packaging container made from sample #1, placing the sealed packaging container made from sample #1 in a sealed container having a height and width of about 30 cm, and using a detecting tube to measure the amount of transmitted hydrogen sulfide as one type of decay gas transmitted from the packaging container made from sample #1 in the larger sealed container. Sampling was carried out from the first to eighth day.

The amount of transmitted hydrogen sulfide at room temperature was measured and found to be a numerical value of 0 in terms of concentration (ppm) for the entire period of the first to eighth day.

FIG. 6 shows the results of measuring the amount of transmitted hydrogen sulfide using the detecting tube of example 7.

Common packaging bags for raw fish, meats, and the like having substantially the same size as the packaging containers made from sample #1 were made from a polyvinyl chloride sheet having a thickness of 0.2 mm without the use of an antioxidant, an antibacterial, or another additive. These bags were used as comparative example 13 of example 7. The testing method and sampling were carried out in the same fashion as example 7.

The amount of transmitted hydrogen sulfide at room temperature was measured and found to be concentration of 0 ppm for the first to fifth day, 0.3 ppm on the seventh day, and about 1.25 ppm on the eighth day.

FIG. 6 shows the results of measuring the amount of transmitted hydrogen sulfide using the detecting tube of comparative example 13.

Common packaging bags for raw fish, meats, and the like having substantially the same size as the packaging containers made from sample #1 were made using a polyethylene film having a thickness of about 0.06 mm as the inner layer and a nylon film having a thickness of about 0.005 mm as the outer layer to form a two-layer structure plastic sheet having an overall thickness of 0.065 mm without the use of an antioxidant, an antibacterial, or another additive. These bags were used as comparative example 14 of example 7. The testing method and sampling were carried out in the same fashion as example 7.

The amount of transmitted hydrogen sulfide at room temperature was measured and found to be concentration of 0 ppm for the first and second day, about 3.5 ppm on the third day, about 11 ppm on the fourth day, about 17.5 ppm on the fifth day, about 25 ppm on the seventh day, and about 16 ppm on the eighth day.

FIG. 6 shows the results of measuring the amount of transmitted hydrogen sulfide using the detecting tube of comparative example 14.

Common packaging bags for raw fish, meats, and the like having substantially the same size as the packaging containers made from sample #1 were made using a polyethylene film having a thickness of about 0.05 mm without the use of an antioxidant, an antibacterial, or another additive. These bags were used as comparative example 15 of example 7. The testing method and sampling were carried out in the same fashion as example 7.

The amount of transmitted hydrogen sulfide at room temperature was measured and found to be concentration of 0 ppm for the first and second day, about 1.7 ppm on the third day, about 18.1 ppm on the fourth day, about 100 ppm on the fifth day, about 400 ppm on the seventh day, and about 300 ppm on the eighth day.

FIG. 6 shows the results of measuring the amount of transmitted hydrogen sulfide using the detecting tube of comparative example 15.

Example 8

A packaging container made from sample No 1 was used as a test packaging container of the present invention, of which a bag was made from a three-layer structure plastic sheet of second embodiment shown in FIG. 2 and had a size of about 15 cm long×about 25 cm wide and whole thickness of the three-layer structure sheet of about 0.132 mm, consisting of an inner layer of an about 0.1 mm thick polyethylene film, an intermediate layer of an about 0.012 mm thick high gas barrier polyvinyl alcohol film and an outer layer of an about 0.020 mm thick polypropylene film. A low-density polyethylene film was used as an inner layer of a polyethylene film and contained 5 parts by weight of catechin as an antioxidant and 5 parts by weight of a silver ion-type antibacterial as an antibacterial relative to 100 parts by weight of a polyethylene film, which were dispersed to mix in the low-density polyethylene film.

A test method involved packing about 100 g of raw meats in a packaging container made from sample #1 and further placing a sealed packaging container made from sample #1 in a container having a length, width, and height of about 30 cm to measure with GCMS (Gas Chromatograph Mass Spectrometer) an amount of dimethyl disulfide, 2-butanone, dimethyl sulfide, ethanol and methylmercaptan as types of decomposed components transmitted through the packaging container made from sample #1 in the larger sealed container. Sampling was performed on first to eighth days.

An amount of the decay components transmitted at ambient temperature was zero as a detected amount of the decay components over the entire period of first to eighth days.

FIG. 7 shows the results of measuring the amount of transmitted decay components noted above using the GCMS measurement of example 8.

A common packaging bag for raw fishes and meats was used as comparative example 16 against example 8, of which a bag was made from an about 0.2 mm thick polyvinyl chloride sheet not containing an additive such as an antioxidant or antibacterial and had roughly the same size as a packaging container made from sample #1. A test method and sampling were similar to those in example 8.

An amount of the above decomposed components transmitted at ambient temperature was measured to give an amount of decomposed components detected to be 0 on first day, about 180 on second day, about 300 on third day, about 380 on fourth day, about 500 on fifth day and about 800 on seventh and eighth days.

FIG. 7 shows the results of measuring the amount of transmitted decay components noted above using the GCMS measurement of comparative example 16.

A common packaging bag for raw fishes and meats was used as comparative example 17 against example 8, of which a bag was made from a two-layer structure plastic sheet and whole thickness of about 0.065 mm, consisting of an about 0.06 mm thick polyethylene film as an inner layer and an about 0.005 mm thick nylon film as an outer layer but not containing an additive such as an antioxidant or antibacterial in the inner layer of the polyethylene film and had roughly the same size as a packaging container made from sample #1. Test methods and sampling were similar to those in example 8.

An amount of the above decomposed components transmitted at ambient temperature was measured to give an amount of decomposed components detected to be 0 on first day, about 250 on second day, about 500 on third day, about 550 on fourth day, about 480 on fifth day, about 630 on seventh and about 620 on eighth days.

FIG. 7 shows the results of measuring the amount of transmitted decay components noted above using the GCMS measurement of comparative example 17.

A common packaging bag for raw fishes and meats was used as comparative example 18 against example 8, of which a bag was made from an about 0.05 mm thick polyethylene film not containing an additive such as an antioxidant or antibacterial and had roughly the same bag size as a packaging container made from sample #1. Test methods and sampling were similar to those in example 8.

An amount of the above decomposed components transmitted at ambient temperature was measured to give an amount of decomposed components detected to be 0 on first day, about 260 on second day, about 550 on third day, about 600 on fourth day, about 1300 on fifth day, about 3500 on seventh day and about 4000 on eighth day.

FIG. 7 shows the results of measuring the amount of transmitted decay components noted above using the GCMS measurement of comparative example 18.

Example 9

A packaging container made from sample #1 was used as a test packaging container of the present invention, of which a bag was made from a three-layer structure plastic sheet of second embodiment shown in FIG. 2 and had a size of about 30 cm long×about 50 cm wide and whole thickness of the three-layer structure sheet of about 0.132 mm, consisting of an inner layer of an about 0.1 mm thick polyethylene film, an intermediate layer of an about 0.012 mm thick high gas barrier polyvinyl alcohol film, an outer layer of an about 0.020 mm thick polypropylene film. A low-density polyethylene film was used as an inner layer of a polyethylene film and contained 5 parts by weight of catechin as an antioxidant and 5 parts by weight of a silver ion-type antibacterial as an antibacterial relative to 100 parts by weight of a polyethylene film, which were dispersed to mix in the low-density polyethylene film.

A test method involved packing about 7 kg of raw tuna blocks in a packaging container made from sample #1 and measuring a K-value indicative of freshness of raw tuna. Sampling was performed after 72 hours.

A K-value indicates a total amount of inosinic acid and hypoxanthine relative to a total amount of adenosine diphosphate, adenosine monophosphate, inosinic acid and hypoxanthine as a metabolite of adenosine triphosphate and it is believed that raw fishes and meats are generally edible in a raw state when a K-value is below 20%, cooked products are edible when 20% or higher and materials are not suitable as food when 50% or higher.

A K-value of about 10% was determined in raw tuna blocks kept at 10° C. to 15° C. after 72 hours.

FIG. 8 shows the results of measuring the K-values in raw tuna stored in a packaging container made from sample #1 in example 9.

A common packaging bag for raw fishes and meats was used as comparative example 19 against example 9, of which a bag was made from an about 0.1 mm thick polycarbonate sheet not containing an additive such as an antioxidant or antibacterial and had roughly the same size as a packaging container made from sample #1. A test method involves packing about 7 kg of raw tuna blocks in a packaging container in comparative example 19 similar to that made from sample #1 and measuring a K-value indicative of freshness of raw tuna. Sampling was performed after 72 hours.

A K-value of about 36% was determined in raw tuna blocks kept at 10° C. to 15° C. after 72 hours.

FIG. 8 shows the results of measuring the K-values in raw tuna stored in a packaging container made from sample #1 in comparative example 19.

A common packaging bag for raw fishes and meats was used as comparative example 20 against example 9, of which a bag was made from an about 0.1 mm thick polyvinyl chloride sheet not containing an additive such as an antioxidant or antibacterial and had roughly the same size as a packaging container made from sample #1. A test method involved packing about 7 kg of raw tuna blocks in a packaging container in comparative example 20 similar to that made from sample #1 and measuring a K-value indicative of freshness of raw tuna. Sampling was performed after 72 hours.

A K-value of about 75% was determined in raw tuna blocks kept at 10° C. to 15° C. after 72 hours.

FIG. 8 shows the results of measuring the K-values in raw tuna stored in a packaging container made from sample #1 in comparative example 20.

INDUSTRIAL APPLICABILITY

The present invention is suitably for use in maintaining the freshness of raw fish and meats and the storage and transport thereof over a long period of time.

The invention claimed is:

1. A packaging container in the form of a sealable bag formed using a plastic film laminate three-layer sheet including a polyvinyl alcohol film layer having gas barrier properties with a polyethylene film layer on one side thereof and a polypropylene film layer on the other side thereof, wherein the polyethylene film layer contains 1 to 20 parts by weight collectively of an antioxidant and an antibacterial per 100 parts by weight of the polyethylene film, wherein the polyethylene film layer forms an inner surface of the packaging container, wherein the polyethylene film layer is configured to permit the antioxidant and the antibacterial to be bled out onto an exposed surface of the polyethylene film layer such that the antioxidant is effective for suppressing activity of aerobic bacteria by reducing oxygen in an interior of the sealable bag and the antibacterial is effective for suppressing proliferation of microorganisms on storage materials sealed within the sealable bag and directly contacted by the polyethylene film layer, without compromising properties of the polyethylene film, wherein the polyethylene layer consists essentially of polyethylene, the antioxidant and the antibacterial, and wherein said antioxidant is catechin and said antibacterial is a silver-ion antibacterial.

2. The packaging container according to claim 1, wherein the three-layer structure plastic sheet has the thickness of the polyethylene film layer set to 50 to 200 μm, the thickness of the polyvinyl alcohol film layer set to 12 to 30 μm and the thickness of the polypropylene film layer set to 15 to 50 μm.

3. The packaging container according to claim 1, wherein the sealable bag is configured to be flattened and thinly folded when storage matter is not being stored therein.

4. The packaging container according to claim 1, wherein the polyvinyl alcohol film layer has an oxygen gas transmissivity of ≤1.0 cc/m$^2$·d·atm.

5. The packaging container according to claim 1, wherein the polyethylene film layer has a content ratio of the antibacterial and the antioxidant in a range of 1:1/100 to 1/100 in terms of antibacterial to antioxidant.

6. The packaging container according to claim 5, wherein the sealable bag is configured to be flattened and thinly folded when storage matter is not being stored therein.

7. A packaging container in the form of a sealable bag formed using a plastic film laminate comprising a polyvinyl alcohol film layer and a polyethylene film layer on one side of the polyvinyl alcohol film layer, the polyvinyl alcohol film layer having gas barrier properties, and the polyethylene film layer forms an inner surface of the packaging container and contains 1 to 20 parts by weight collectively of an antioxidant and an antibacterial per 100 parts by weight of the polyethylene film, wherein said antioxidant is catechin and said antibacterial is a silver-ion antibacterial and the polyethylene film layer is configured to permit the antioxidant and the antibacterial to be bled out onto an exposed surface of the polyethylene film layer such that the antioxidant is effective for suppressing activity of aerobic bacteria by reducing oxygen in an interior of the sealable bag and the antibacterial is effective for suppressing proliferation of microorganisms on storage materials sealed within the sealable bag and directly contacted by the polyethylene film layer, without compromising properties of the polyethylene film, and wherein the polyethylene layer consists essentially of polyethylene, the antioxidant and the antibacterial.

8. The packaging container according to claim 7, wherein the polyethylene film layer has a content ratio of the antibacterial and the antioxidant in a range of 1:1/100 to 1/100 in terms of antibacterial to antioxidant.

9. The packaging container according to claim 7, wherein the polyvinyl alcohol film layer has an oxygen gas transmissivity of ≤1.0 cc/m$^2$·d·atm.

10. The packaging container according to claim 7, wherein the thickness of the polyethylene film layer set to 50 to 200 μm, the thickness of the polyvinyl alcohol film layer set to 12 to 30 μm, and the thickness of the plastic film laminate is 62 to 220 μm, and wherein the sealable bag is configured to be flattened and thinly folded when storage matter is not being stored therein.

11. A packaging container in the form of a sealable bag formed using a plastic film laminate three-layer sheet including a polyvinyl alcohol film layer having gas barrier properties with a polyethylene film layer on one side thereof and a polypropylene film layer on the other side thereof, wherein the polyethylene film layer contains 1 to 20 parts by weight collectively of an antioxidant, an antibacterial, and a preservative per 100 parts by weight of the polyethylene film, wherein the polyethylene film layer forms an inner surface of the packaging container, wherein the polyethylene film layer is configured to permit the antioxidant and the antibacterial to be bled out onto an exposed surface of the polyethylene film layer such that the antioxidant is effective for suppressing activity of aerobic bacteria by reducing oxygen in an interior of the sealable bag and the antibacterial is effective for suppressing proliferation of microorganisms on storage materials sealed within the sealable bag and directly contacted by the polyethylene film layer, without compromising properties of the polyethylene film, wherein the polyethylene layer consists essentially of polyethylene, the antioxidant, the antibacterial, and the preservative, and wherein said antioxidant is catechin and said antibacterial is a silver-ion antibacterial.

12. The packaging container according to claim 11, wherein the polyethylene film layer is configured to also permit the preservative to also be bled out onto the exposed surface of the polyethylene film layer.

13. The packaging container according to claim 11, wherein the thickness of the polyethylene film layer set to 50 to 200 μm, the thickness of the polyvinyl alcohol film layer set to 12 to 30 μm, and the thickness of the polypropylene film layer set to 15 to 50 μm, and wherein the sealable bag is configured to be flattened and thinly folded when storage matter is not being stored therein.

14. The packaging container according to claim 11, wherein the polyethylene film layer has a content ratio of the antioxidant, the antibacterial, and the preservative in a range of 1:1/10 to 1:10 in terms of the sum of the antioxidant and the bacterial to the preservative.

15. The packaging container according to claim 11, wherein the polyvinyl alcohol film layer has an oxygen gas transmissivity of ≤1.0 cc/m$^2$·d·atm.

16. A packaging container in the form of a sealable bag formed using a plastic film laminate comprising a polyvinyl alcohol film layer and a polyethylene film layer on one side of the polyvinyl alcohol film layer, the polyvinyl alcohol film layer having gas barrier properties, and the polyethylene film layer forms an inner surface of the packaging container and contains 1 to 20 parts by weight collectively of an antioxidant, an antibacterial, and a preservative per 100 parts by weight of the polyethylene film, wherein said antioxidant is catechin and said antibacterial is a silver-ion antibacterial and the polyethylene film layer is configured to permit the antioxidant and the antibacterial to be bled out onto an exposed surface of the polyethylene film layer such that the antioxidant is effective for suppressing activity of aerobic bacteria by reducing oxygen in an interior of the sealable bag and the antibacterial is effective for suppressing proliferation of microorganisms on storage materials sealed within the sealable bag and directly contacted by the polyethylene film layer, without compromising properties of the polyethylene film, and wherein the polyethylene layer consists essentially of polyethylene, the antioxidant, the antibacterial, and the preservative.

17. The packaging container according to claim 16, wherein the polyethylene film layer has a content ratio of the antioxidant, the antibacterial, and the preservative in a range of 1:1/10 to 1:10 in terms of the sum of the antioxidant and the bacterial to the preservative.

18. The packaging container according to claim 16, wherein the thickness of the polyethylene film layer set to 50 to 200 μm, the thickness of the polyvinyl alcohol film layer set to 12 to 30 μm, and the thickness of the plastic film laminate is 62 to 220 μm, and wherein the sealable bag is configured to be flattened and thinly folded when storage matter is not being stored therein.

19. The packaging container according to claim 16, wherein the polyvinyl alcohol film layer has an oxygen gas transmissivity of $\leq 1.0$ cc/m$^2$·d·atm.

* * * * *